United States Patent
Scheschko et al.

(10) Patent No.: US 9,865,933 B2
(45) Date of Patent: Jan. 9, 2018

(54) METHOD FOR CALIBRATING A RADAR SENSOR, AND RADAR SYSTEM

(71) Applicant: Robert Bosch GmbH, Stuttgart (DE)

(72) Inventors: Toni Manuel Scheschko, Erdmannhausen (DE); Benedikt Lehnertz, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 373 days.

(21) Appl. No.: 14/691,841

(22) Filed: Apr. 21, 2015

(65) Prior Publication Data

US 2015/0301159 A1 Oct. 22, 2015

(30) Foreign Application Priority Data

Apr. 22, 2014 (DE) .................. 10 2014 207 523

(51) Int. Cl.
| | |
|---|---|
| *H01Q 15/18* | (2006.01) |
| *G01S 7/40* | (2006.01) |
| *G01S 13/91* | (2006.01) |
| *G01S 13/00* | (2006.01) |

(52) U.S. Cl.
CPC .......... *H01Q 15/18* (2013.01); *G01S 7/4026* (2013.01); *G01S 13/91* (2013.01); *G01S 2007/4034* (2013.01)

(58) Field of Classification Search
CPC . G01S 7/02; G01S 7/40; G01S 7/4004; G01S 7/4026; G01S 2007/4034; G01S 13/88; G01S 13/91; H01Q 15/14; H01Q 15/16; H01Q 15/18
See application file for complete search history.

(56) References Cited

U.S. PATENT DOCUMENTS

| | | | | |
|---|---|---|---|---|
| 6,020,844 A * | 2/2000 | Bai | ................... | G01S 7/4026 342/147 |
| 6,636,172 B1 * | 10/2003 | Prestl | ................... | G01S 7/4026 342/173 |
| 6,778,131 B2 * | 8/2004 | Haney | ................... | G01S 7/4026 342/165 |
| 7,046,191 B2 * | 5/2006 | Tokutsu | ................... | G01S 7/4026 342/165 |
| 7,183,969 B2 * | 2/2007 | Pozgay | ................... | G01S 7/4004 342/145 |
| 7,545,313 B2 * | 6/2009 | Okamura | ................... | G01S 7/4026 342/173 |
| 2011/0007157 A1 | 1/2011 | Sekelsky et al. | | |

* cited by examiner

*Primary Examiner* — Bernarr E Gregory
(74) *Attorney, Agent, or Firm* — Norton Rose Fulbright US LLP; Gerard Messina

(57) ABSTRACT

A method, and corresponding radar system, for calibrating a radar sensor, including: placing at least one reference object at a predetermined position in the field of view of the radar sensor; sensing an estimated position of the at least one reference object by way of the radar sensor; calculating a correction value for the position of the at least one reference object based on the predetermined position of the at least one reference object and on the estimated position, sensed by the radar sensor, of the at least one reference object; and applying the calculated correction value to estimated positions, sensed by the radar sensor, of further objects in the field of view of the radar sensor.

8 Claims, 3 Drawing Sheets

METHOD FOR CALIBRATING A RADAR SENSOR, AND RADAR SYSTEM

RELATED APPLICATION INFORMATION

The present application claims priority to and the benefit of German patent application no. 10 2014 207 523.8, which was filed in Germany on Apr. 22, 2014, the disclosure of which is incorporated herein by reference.

FIELD OF THE INVENTION

The present invention relates to a method for calibrating a radar sensor, and to a corresponding radar system.

BACKGROUND INFORMATION

Radar sensors are used nowadays in a plurality of applications. Radar sensors can be used, for example in mobile or stationary applications for surroundings monitoring. Radar sensors are used in vehicles, for example, to detect preceding vehicles or ones approaching from behind, and to decelerate the vehicle if applicable or to warn the driver.

Stationary radar sensors, on the other hand, can be used, for example, to monitor a predetermined space. Railway crossings, for example, can be monitored using a radar sensor. The intention is to detect at such railway crossings, with the aid of the radar sensor, whether an object is present, for example, on or in the vicinity of the tracks. If such an object is detected, a warning can be directed to a driver of an approaching train or the train can be, for example, automatically decelerated.

In order to allow effective monitoring of such a predetermined space using stationary radar sensors, it is necessary to be able to determine the size of the objects sensed by the radar sensor.

Patent document US 2 011 007 157 A1 presents, for example, a radar system for monitoring a predetermined space.

Such radar systems may possess a height estimating system for objects located in front of the respective radar sensor. This height estimate requires, however, a parallel alignment of the vertical sensor axis with the plane on which the objects are located. Even small deviations, of a few tenths of a degree, between said plane and the vertical sensor axis can result in large errors in the estimate of the object's size. For example, a small deviation of 1° for a distance of 20 m between the object and the radar sensor already yields an inaccuracy of 0.5 m in the height estimate. This situation is illustrated in FIG. 6.

In FIG. 6 a radar sensor is disposed at a height h. The road, which represents the plane to be monitored, extends horizontally. The vertical sensor axis is rotated upward through an angle α. The object height is consequently estimated by the radar sensor to be lower (crosshatched area) than the actual object height (non-crosshatched area).

SUMMARY OF THE INVENTION

The present invention discloses a method having the features described herein and a radar system having the features described herein.

The following is provided in accordance therewith:

A method for calibrating a radar sensor, having the steps of: placing at least one reference object at a predetermined position in the field of view of the radar sensor; sensing an estimated position of the at least one reference object by way of the radar sensor; calculating a correction value for the position of the at least one reference object based on the predetermined position of the at least one reference object and on the estimated position, sensed by the radar sensor, of the at least one reference object; and applying the calculated correction value to estimated positions, sensed by the radar sensor, of further objects in the field of view of the radar sensor.

The following is also provided:

A radar system, having a radar sensor and a control device that is embodied to carry out a method according to the present invention.

The realization on which the present invention is based is that manual calibration of a radar sensor is very complex and error-prone.

On aspect of the present invention is to acknowledge said realization and to provide a method in which a radar sensor automatically calibrates itself with no need for action by a technician.

For this, reference objects are placed at predetermined positions and are then sensed by the radar sensor. These predetermined positions are known to the radar sensor.

As a result, the radar can carry out an adjustment between those positions of the reference objects which are estimated from the radar signal and the real positions, which it knows, of the reference objects.

According to the present invention the adjustment encompasses calculation of a correction value for correcting the estimated position of a sensed object. This correction value can be calculated in particular based on the known predetermined positions of the reference objects, and on the positions estimated from the radar signal.

Lastly, this calculated correction value can be applied to further measurements and to the positions, estimated from a radar signal, of objects.

The present invention offers a reliable and simple capability for aligning a stationary radar sensor in the vertical direction.

Advantageous embodiments and refinements are evident from the further descriptions herein and from the description with reference to the Figures.

In an embodiment, the sensing of an estimated position of the at least one reference object encompasses the identification of the at least one reference object in a plurality of objects sensed by the radar sensor. It is thereby possible for a calibration to be carried out even if further objects, besides the reference objects, are present in front of the radar sensor or in the field of view of the radar sensor.

In an embodiment, the identification is carried out in particular on the basis of the backscattered power level of the respective object. This makes possible very simple identification of the reference objects.

In an embodiment, an area to be monitored by the radar sensor is predetermined, and at least two reference objects are placed in the area to be monitored. This placement makes possible simple calibration of the radar sensor using few reference objects.

In an embodiment, upon the calculation of a correction value the difference between the actual height of each reference object and the estimated height, sensed by the sensor, of the respective reference object is calculated. A discrepancy plane is created from the calculated differences. The use of the reference objects makes possible a very simple calculation of the adjustment plane.

In an embodiment, application of the calculated correction value encompasses calculation of the height value for the estimated position of each of the objects in the discrepancy plane. Application of the calculated correction value for each object further encompasses adding the calculated height value in the discrepancy plane to the height value of the estimated position of the respective object. A very simple correction of the height of the respective object can be carried out in this manner.

In an embodiment, the calculation of the height value in the discrepancy plane encompasses generation of a linear equation that encompasses the horizontal position and the distance of the respective object as fixed reference magnitudes, and the height of the respective object as a variable reference magnitude. The linear equation that is generated is furthermore inserted into the planar equation of the discrepancy plane, and the resulting equation is solved for the variable reference magnitude. This enables very simple implementation of the steps necessary for correcting a height value, using simple vector geometry. These calculations can be embodied, for example, in a control device as program instructions optimized for data processing by a computation device.

In an embodiment, the value for the variable reference magnitude is inserted into the linear equation that is generated. The value, resulting in the linear equation, for the height of the respective object is furthermore used as a height value of the respective object in the correction plane.

In an embodiment, the steps S1 to S3 are executed once upon commissioning of the radar sensor. This appreciably simplifies commissioning, since manual calibration of the radar sensor is not necessary.

In an embodiment, steps S1 to S3 are executed cyclically during operation of the radar sensor. This makes it possible to react to changes in the position or orientation of the radar sensor during operation of the radar sensor.

In an embodiment, the at least one reference object is a corner reflector. Very simple and accurate localization of the reference objects can be carried out as a result.

In a further embodiment, the at least one reference object is one of the further objects present in the field of view of the radar sensor. It is thereby possible, for example, to use permanently installed objects, for example equipment cabinets at railway crossings, for calibration. This makes possible, in particular, cyclic recalibration while the radar sensor is in operation.

In an embodiment, the radar sensor is embodied as an FMCW radar sensor. It is thereby possible to ensure object sensing with the aid of the radar sensor independently of weather conditions.

The above embodiments and refinements can be combined in any way with one another to the extent that is useful. Further possible embodiments, refinements, and implementations of the invention encompass combinations, including ones not explicitly recited, of features of the invention that are described previously or hereinafter with regard to the exemplifying embodiments. In particular, one skilled in the art will also add individual aspects as improvements or additions to the respective basic form of the present invention.

The present invention will be explained in further detail below with reference to the exemplifying embodiments indicated in the schematic Figures of the drawings.

In all the Figures, identical or functionally identical elements and apparatuses have been labeled, unless otherwise indicated, with the same reference characters.

DETAILED DESCRIPTION

Figure 1:
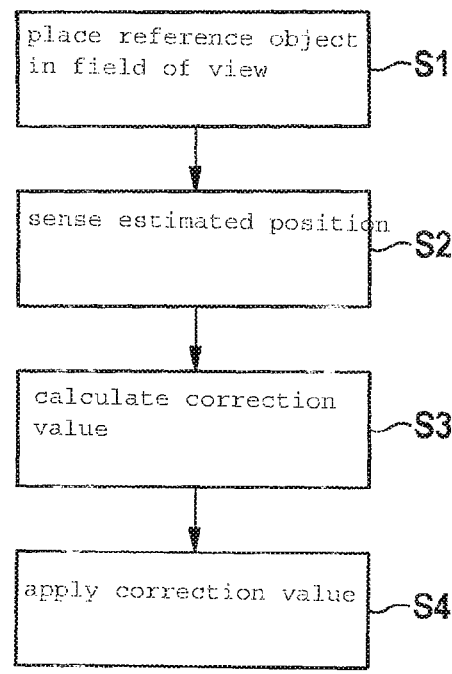
FIG. 1 is a flow chart of an embodiment of a method according to the present invention.

FIG. 1 is a flow chart of an embodiment of a method according to the present invention for calibrating a radar sensor 1.

The method provides that in a first step S1, at least one reference object 2-1 to 2-4 is placed at a predetermined position in field of view 3 of radar sensor 1.

An estimated position of the at least one reference object 2-1 to 2-4 is then sensed by radar sensor 1.

In a third step S3, a correction value for the position of the at least one reference object 2-1 to 2-4 is then calculated, based on the predetermined position of the at least one reference object 2-1 to 2-4 and the estimated position, sensed by radar sensor 1, of the at least one reference object 2-1 to 2-4.

Lastly, the calculated correction value is applied to the positions, sensed by radar sensor 1, of further objects 4-1 to 4-8 in field of view 3 of radar sensor 1.

In an embodiment, the method further provides that the at least one reference object 2-1 to 2-4 is identified in a plurality of objects 2-1 to 2-4, 4-1 to 4-8 identified by the radar sensor. This can occur, for example, on the basis of special features such as the backscatter power level of the respective object 2-1 to 2-4, 4-1 to 4-8.

The correct height of one of objects 2-1 to 2-8 can then be calculated as follows:

Firstly, for reference objects 2-1 to 2-4, the differences between their real installation heights defined by the predetermined positions and the height estimated by the sensor are calculated:

$$diff_i = h_{Ref,i} - h_{SensorObject,i}$$

where $h_{Ref,i}$ indicates the installation height defined by the predetermined position of the i-th reference object 2-1, and $h_{SensorObject,i}$ indicates the height, estimated by the sensor, of the i-th reference object 2-1 to 2-4.

From this information, a discrepancy plane E can be created which is defined as follows:

$$E: \vec{n} \cdot (\vec{x} - \vec{p}) \text{ where } \vec{u} = \begin{pmatrix} x_{SensorObject,1} \\ y_{SensorObject,2} \\ diff_1 \end{pmatrix}, \vec{v} = \begin{pmatrix} x_{SensorObject,1} \\ y_{SensorObject,2} \\ diff_2 \end{pmatrix} \text{ and}$$

$$\vec{n} = \vec{u} \times \vec{v} \text{ and } \vec{p} = 0.$$

The error in the height, determined by the sensor, of the respective object 4-1 to 4-8 can be determined based on this discrepancy plane.

Alternatively, two rotation angles can also be calculated. With these, a technician could rotate radar sensor 1. Two angles are necessary because radar sensor 1 can be tilted in terms of an X and a Y axis.

The estimated height of objects 4-1 to 4-8 is then corrected in every measurement cycle of radar sensor 1. This is done by determining for each object 4-1 to 4-8 on the basis of its (X,Y) position, i.e. its position in the plane observed by radar sensor 1, the corresponding Z value or height value in the discrepancy plane E.

For this, the position, sensed by radar sensor 1, of the respective object 4-1 to 4-8 is represented as a line:

$$\vec{x} = \begin{pmatrix} x \\ y \\ 0 \end{pmatrix} + \lambda \cdot \begin{pmatrix} 0 \\ 0 \\ 1 \end{pmatrix}$$

The line is then inserted into the planar equation of discrepancy plane E, and a solution for $\lambda$ is found.

$$E: \vec{n} \cdot \left( \begin{pmatrix} x \\ y \\ 0 \end{pmatrix} + \lambda \cdot \begin{pmatrix} 0 \\ 0 \\ 1 \end{pmatrix} - \vec{u} \right)$$

The result for $\lambda$ is then inserted into the linear equation for the sensed position for the respective object 4-1 to 4-8. The result obtained is:

$$\vec{x} = \begin{pmatrix} x \\ y \\ z_{Discrepancy} \end{pmatrix}$$

The height of the sensor object can then be corrected as follows:

$$z_{corr} = z_{Sensor} + z_{Discrepancy},$$

where $z_{corr}$ is the corrected height of the respective object 4-1 to 4-8, $z_{sensor}$ represents the height, estimated by radar sensor 1, of the respective object 4-1 to 4-8, and $z_{Discrepancy}$ is the correction value.

The method presented in conjunction with FIG. 1 can provide that the discrepancy plane E is carried out only once upon commissioning of the respective radar sensor 1. Alternatively, the discrepancy plane E can be calculated cyclically or upon identification of a change in the position of radar sensor 1. Such a change could be detected, for example by position sensors or by vibration sensors or by sensing stationary reference objects in area 5 that is to be monitored.

The method presented according to the present invention can be converted in any desired manner into calculation steps that can be executed by a program-controlled device. Vector calculation can be retained. Alternatively, however, another type of calculation, e.g. component-wise, can be selected.

Figure 2:
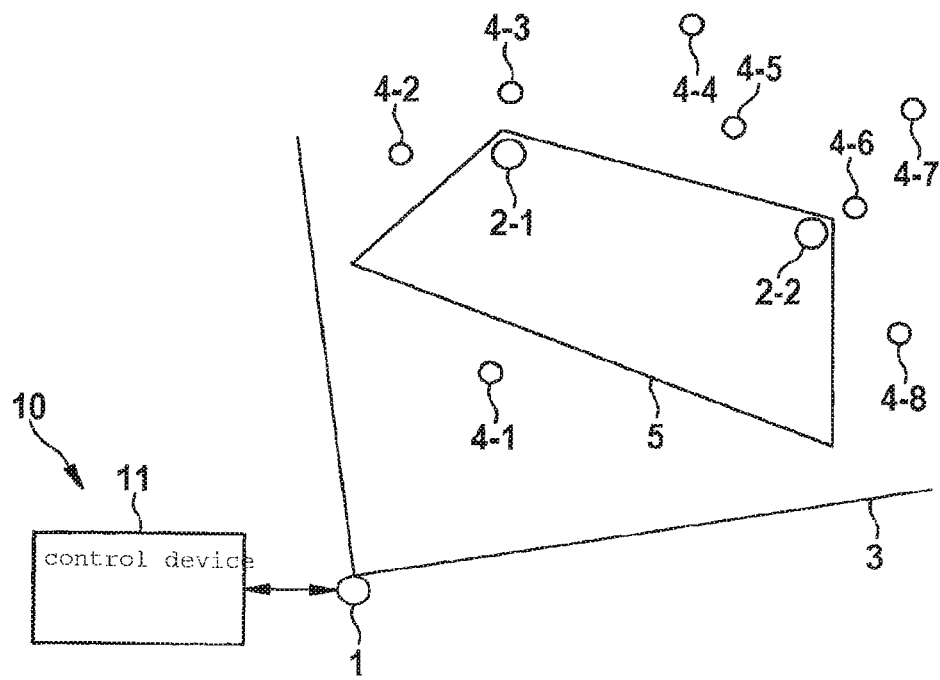
FIG. 2 is a block diagram of an embodiment of a radar system according to the present invention.

FIG. 2 is a block diagram of an embodiment of a radar system 10 according to the present invention.

Radar system 10 has a control device 11 that is coupled to a radar sensor 1 in order to apply control to the latter and to execute the method according to the present invention.

Control device 11 can be embodied, for example, as a control unit integrated into radar sensor 1. Alternatively, control device 11 can also be configured as a program-controlled device disposed externally to radar sensor 1. In such a case control device 11 can be disposed, for example, on radar sensor 1. Alternatively, however, control device 11 can also be disposed, for example, in a control center or a computing center, and can be coupled to radar sensor 1 via a data connection, e.g. a network connection.

Radar sensor 1 is embodied in FIG. 2 as a FMCW radar sensor 1. Further types of radar sensor 1 are likewise possible.

An area, spanning approximately a right angle, that represents field of view 3 of radar sensor 1 is depicted as proceeding from radar sensor 1. Depicted within this field of view 3 is an area 5 to be monitored, which is of approximately trapezoidal shape. In area 5 to be monitored, one reference object 2-1 to 2-2 is depicted (with large circles) at each of the corners of the trapezoid that are remote from radar sensor 1. An object 4-1 is depicted (with a small circle) between radar sensor 1 and area 5 to be monitored. Further objects 4-2 to 4-8 (depicted with small circles) are shown distributed around the trapezoidal area 5 to be monitored.

Figure 3:
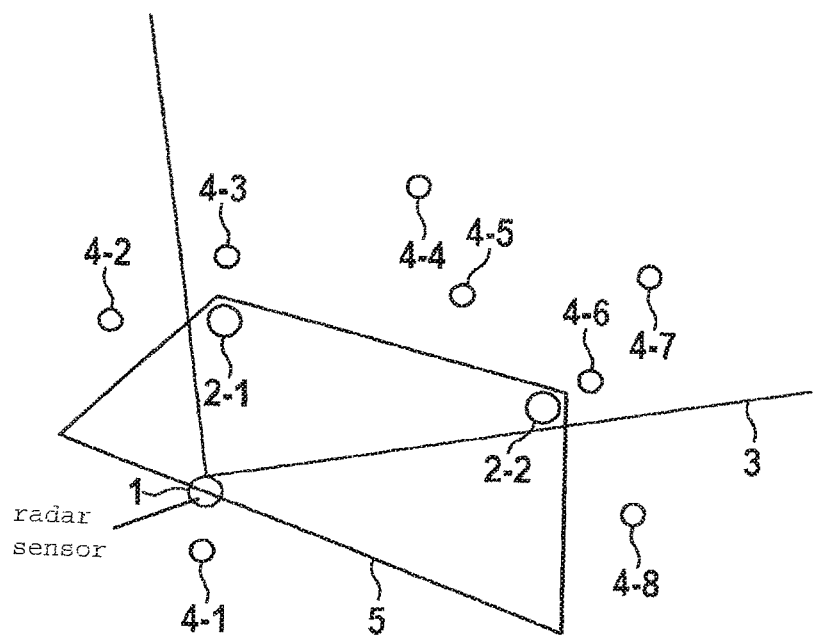
FIG. 3 is a diagram to illustrate an embodiment of the method according to the present invention.

FIG. 3 is a diagram to illustrate an embodiment of the method according to the present invention.

The disposition in FIG. 3 corresponds largely to the disposition in FIG. 2, except that radar sensor 1 is disposed inside area 5 to be monitored.

This disposition makes possible a very simple determination of the correction value or discrepancy plane E, since plane 5 or area 5 to be monitored can be determined by way of the position of radar sensor 1 and two further points (the positions of reference objects 2-1 to 2-2) disposed in plane 5.

Figure 4:
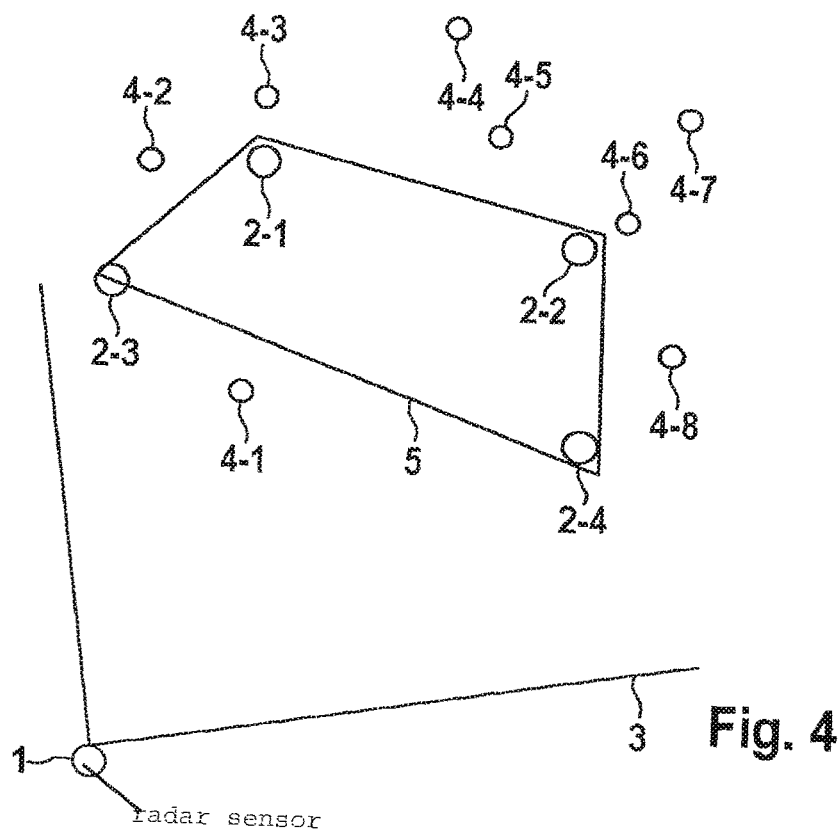
FIG. 4 is a further diagram to illustrate an embodiment of the method according to the present invention.

FIG. 4 is a further diagram to illustrate an embodiment of the method according to the present invention in which, in contrast to the disposition in FIG. 3, radar sensor 1 is located in front of plane 5 or area 5 to be monitored, similarly to the disposition in FIG. 2.

Because the radar sensor of FIG. 4 is located outside area 5 to be monitored, four reference objects 2-1 to 2-4 are used so that area 5 can be unequivocally identified. These reference objects 2-1 to 2-4 are each disposed at one corner of the trapezoidal area 5 to be monitored. A corresponding calculation can already be carried out using only three of reference objects 2-1 to 2-4.

The calculations explained in conjunction with FIG. 1 are thereby modified as follows:

$$E: \vec{n} \cdot (\vec{x} - \vec{p}) \text{ where } \vec{u} = \begin{pmatrix} x_{SensorObject,3} - x_{SensorObject,1} \\ y_{SensorObject,3} - y_{SensorObject,1} \\ diff_3 - diff_1 \end{pmatrix}, \vec{v} =$$

$$\begin{pmatrix} x_{SensorObject,3} - x_{SensorObject,2} \\ y_{SensorOjbect,3} - y_{SensorOjbect,2} \\ diff_3 - diff_2 \end{pmatrix} \text{ and } \vec{n} = \vec{u} \times \vec{v} \text{ and } \vec{p} = \begin{pmatrix} x_{SensorObject,3} \\ y_{SensorObject,3} \\ diff_3 \end{pmatrix}.$$

$$E: \vec{n} \cdot \left( \begin{pmatrix} x \\ y \\ 0 \end{pmatrix} + \lambda \cdot \begin{pmatrix} 0 \\ 0 \\ 1 \end{pmatrix} - \vec{p} \right).$$

Figure 5:
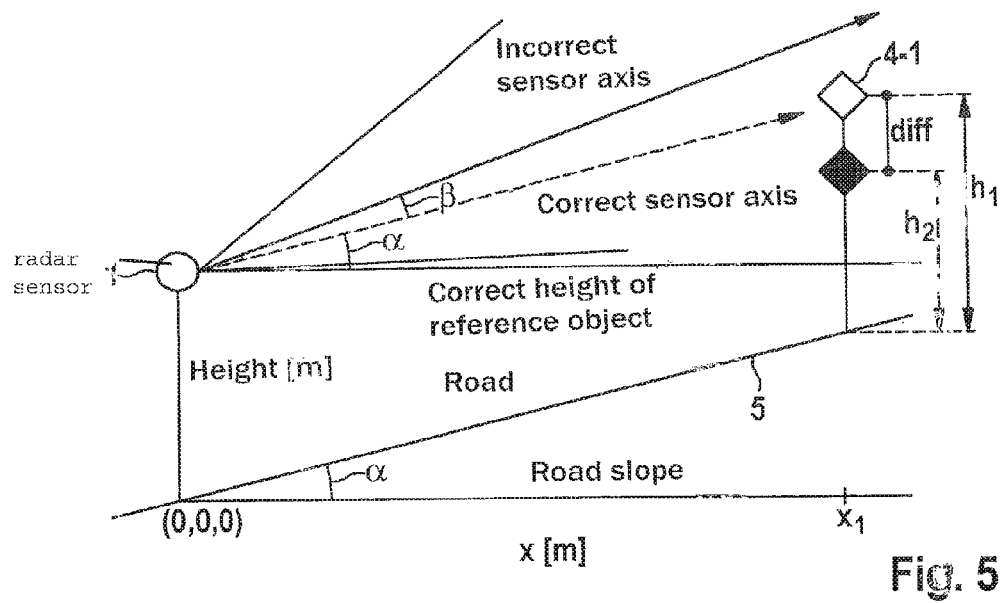
FIG. 5 is a further diagram to illustrate an embodiment of the method according to the present invention.
Figure 6:
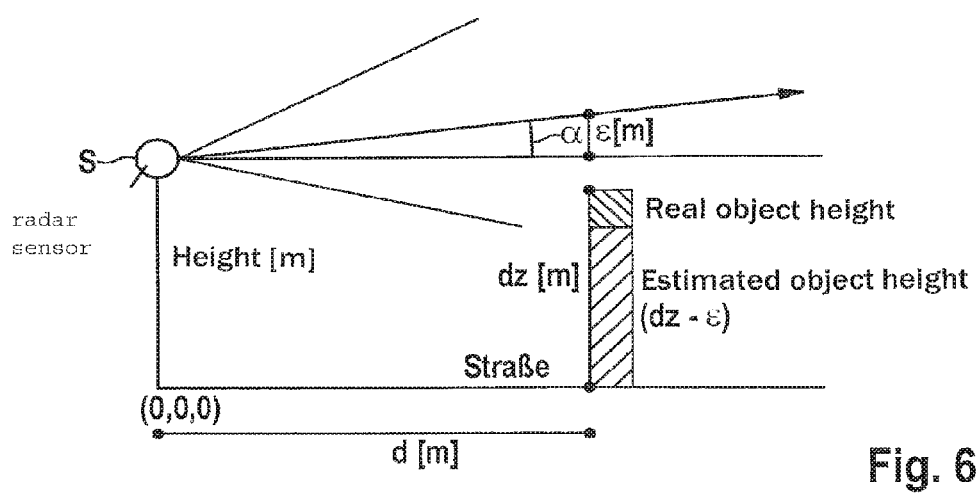
FIG. 6 is a diagram to illustrate an uncalibrated radar sensor.

FIG. 5 is a further diagram to illustrate an embodiment of the method according to the present invention. FIG. 5 is a side view of a radar sensor 1 and of area 5 to be monitored (a road). The road has a slope having an angle $\alpha$. Radar sensor 1 is disposed at a height h above road 5. The vertical sensor axis of radar sensor 1 is rotated upward through an angle $\beta$ with respect to a correct sensor axis. A white diamond represents an object 4-1 that is located at a distance x1 in front of the sensor and at a height h1 above the road surface.

Because the sensor axis of radar sensor 1 is rotated upward through the angle β with respect to a correct sensor axis, however, object 4-1 appears to radar sensor 1 to be lower than where it is actually located. Without calibration according to the present invention, radar sensor 1 would assign to object 4-1 the height h2, which differs from height h1 by a difference $\text{diff}_i$.

Although the present invention has been described in this instance with reference to exemplifying embodiments, it is not limited thereto but rather is modifiable in many ways. In particular, the invention can be changed or modified in a multiplicity of ways without deviating from the essence of the invention.

What is claimed is:

1. A method for calibrating a radar sensor, comprising:
   placing at least one reference object at a predetermined position in the field of view of the radar sensor;
   sensing an estimated position of the at least one reference object by the radar sensor;
   calculating a correction value for the position of the at least one reference object based on the predetermined position of the at least one reference object and on the estimated position, sensed by the radar sensor, of the at least one reference object; and
   applying the calculated correction value to estimated positions, sensed by the radar sensor, of further objects in the field of view of the radar sensor;
   wherein an area to be monitored by the radar sensor is predetermined, and wherein at least two reference objects are placed in the area to be monitored; and
   wherein upon the calculation of a correction value, the difference between the actual height of each reference object and the estimated height, sensed by the sensor, of the respective reference object is calculated, and wherein a discrepancy plane is created from the calculated differences.

2. The method of claim 1, wherein the sensing of an estimated position of the at least one reference object encompasses the identification of the at least one reference object in a plurality of objects sensed by the radar sensor, and wherein the identification is performed based on a backscattered power level of the respective object.

3. The method of claim 1, wherein the application of the calculated correction value encompasses calculation of the height value for the estimated position of each of the objects in the discrepancy plane, and wherein the application of the calculated correction value for each object further encompasses adding the calculated height value in the discrepancy plane to the height value of the estimated position of the respective object.

4. The method of claim 3, wherein the calculation of the height value in the discrepancy plane encompasses generation of a linear equation that encompasses the horizontal position and the distance of the respective object as fixed reference magnitudes, and the height of the respective object as a variable reference magnitude, and wherein the linear equation that is generated is inserted into the planar equation of the discrepancy plane, and the resulting equation is solved for the variable reference magnitude.

5. The method of claim 4, wherein the value for the variable reference magnitude is inserted into the linear equation that is generated, and the value, resulting in the linear equation, for the height of the respective object is used as a height value of the respective object in the correction plane.

6. The method of claim 1, wherein the tasks of placing, sensing and calculating are executed once upon commissioning of the radar sensor, or are executed cyclically during operation of the radar sensor.

7. The method of claim 1, wherein at least one the following is satisfied: (i) the at least one reference object is a corner reflector, and (ii) the at least one reference object is one of the further objects present in the field of view of the radar sensor.

8. A radar system, comprising:
   a radar sensor; and
   a control device for calibrating the radar sensor, by performing the following:
      placing at least one reference object at a predetermined position in the field of view of the radar sensor;
      sensing an estimated position of the at least one reference object by the radar sensor;
      calculating a correction value for the position of the at least one reference object based on the predetermined position of the at least one reference object and on the estimated position, sensed by the radar sensor, of the at least one reference object; and
      applying the calculated correction value to estimated positions, sensed by the radar sensor, of further objects in the field of view of the radar sensor
      wherein an area to be monitored by the radar sensor is predetermined, and wherein at least two reference objects are placed in the area to be monitored; and
      wherein upon the calculation of a correction value, the difference between the actual height of each reference object and the estimated height, sensed by the sensor, of the respective reference object is calculated, and wherein a discrepancy plane is created from the calculated differences.

* * * * *